US008253603B2

(12) United States Patent
Yang

(10) Patent No.: US 8,253,603 B2
(45) Date of Patent: Aug. 28, 2012

(54) ELECTRONIC DEVICE WITH TYPING PROMPT FUNCTION

(75) Inventor: Hong-Yu Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 561 days.

(21) Appl. No.: 12/545,878

(22) Filed: Aug. 24, 2009

(65) Prior Publication Data

US 2010/0309028 A1   Dec. 9, 2010

(30) Foreign Application Priority Data

Jun. 4, 2009   (CN) .......................... 2009 1 0302925

(51) Int. Cl.
*H03M 11/00*   (2006.01)
(52) U.S. Cl. .......................................... 341/24; 341/22

(58) Field of Classification Search .................... 341/22, 341/24
See application file for complete search history.

(56) References Cited

U.S. PATENT DOCUMENTS 6,799,303 B2 *   9/2004   Blumberg ..................... 715/257
7,506,252 B2 *   3/2009   Blumberg ..................... 715/256

FOREIGN PATENT DOCUMENTS

CN   1786881 A   6/2006

* cited by examiner

*Primary Examiner* — Khai M Nguyen
(74) *Attorney, Agent, or Firm* — Altis Law Group, Inc.

(57) ABSTRACT

A method of typing prompting is provided. The method includes: providing a plurality of transparent keys connected to LEDs on a provided keyboard; determining whether a transparent key is pressed; storing the ASCII code of the input of the pressed transparent key; finding at least one ASCII code as a possible next input towards typing a word from a provided dictionary corresponding to a character input method in use according to the stored ASCII code; lighting up at least one LED corresponding to the at least one found ASCII code according to provided relationships between the LEDs and the ASCII codes of the input of the transparent keys. A related electronic device is also provided.

10 Claims, 3 Drawing Sheets

ELECTRONIC DEVICE WITH TYPING PROMPT FUNCTION

BACKGROUND

1. Technical Field

The present disclosure relates to electronic devices and, particularly, to an electronic device with typing prompt function.

2. Description of Related Art

There are quite a few keys on a standard keyboard, and novice typists frequently make mistakes, especially during word processing.

Therefore, what is needed is an electronic device that can assist users in correctly entering data via a keyboard.

BRIEF DESCRIPTION OF THE DRAWINGS

The components of the drawings are not necessarily drawn to scale, the emphasis instead being placed upon clearly illustrating the principles of the electronic device with typing prompt function. Moreover, in the drawings, like reference numerals designate corresponding parts throughout several views.

DETAILED DESCRIPTION

Figure 1:
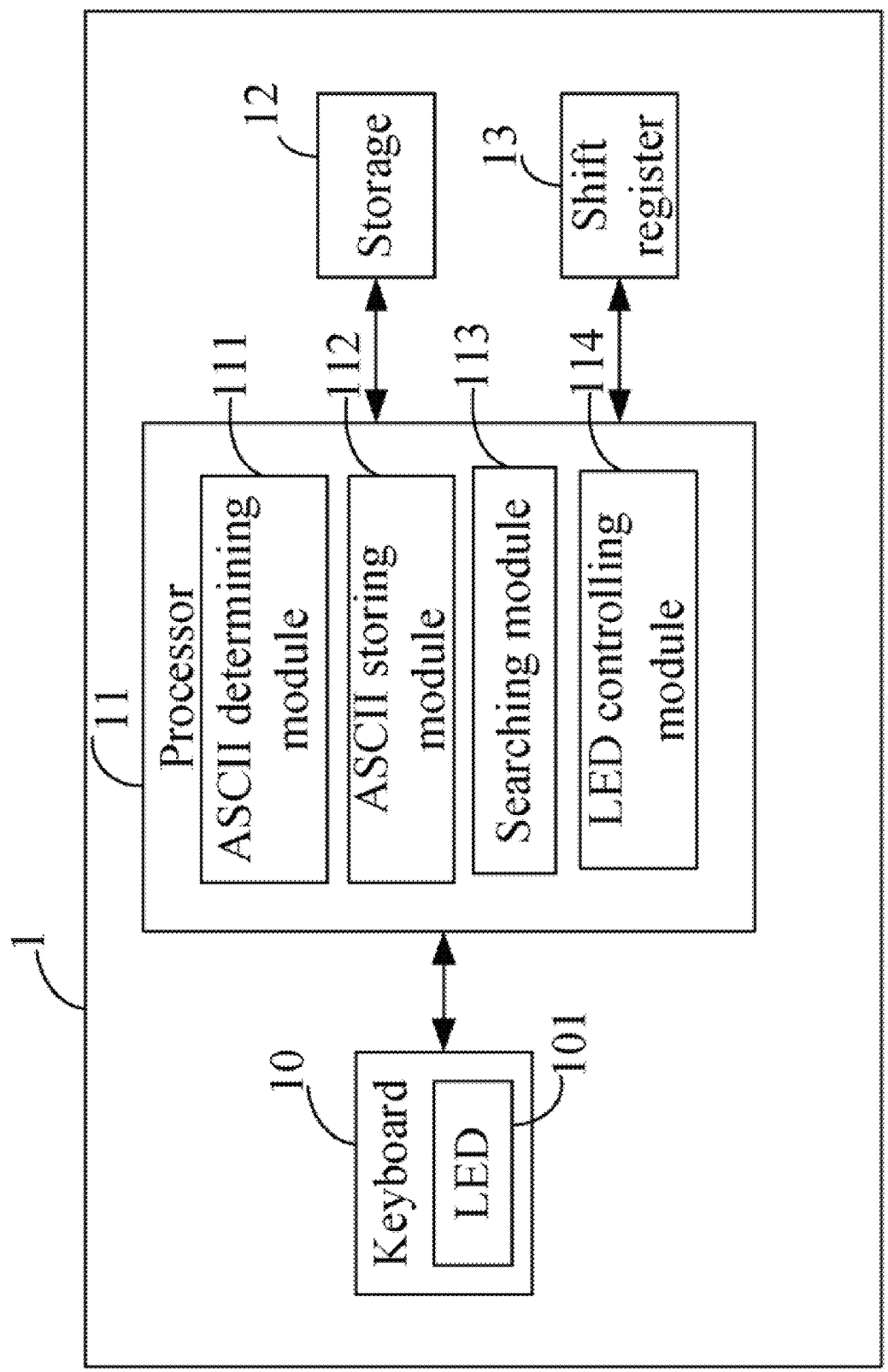
FIG. 1 is a block diagram of an electronic device with typing prompt function in accordance with an exemplary embodiment.

FIG. 1 is a block diagram of an electronic device 1 with typing prompt function in accordance with an exemplary embodiment. For users who do not know how to touch-type it can be difficult to enter data quickly and correctly. The electronic device 1 uses a dictionary and a plurality of light emitting diodes (LEDs) to help the user. As a user types letters to form a word, the dictionary is used to guess what possible letters can be entered next to from a proper word and the corresponding LEDs are lit up to bring the keys quickly to the attention of the user. Therefore, the user does not need to "hunt and peck."

In the embodiment, the electronic device 1 includes a keyboard 10. A plurality of labeled transparent keys (not shown) is arranged on the keyboard 10. Each of the transparent keys is connected to an LED 100. The labels identify what input is associated with the corresponding key and the input is the usual input found on a typical IBM compatible keyboard as defined by ASCII codes. In this embodiment, the labels on the labeled transparent keys are A~Z letters. A special key (not shown) is further arranged on the keyboard 10 for starting the typing prompt function. In other embodiments, the electronic device 1 automatically activates the typing prompt function when powered up, without use of a special key.

The electronic device 1 further includes a processor 11, a storage 12, and a shift register 13. The storage 12 is configured for storing at least one dictionary corresponding to a character input method. For the dictionary corresponding to a character input method, it includes a plurality of words, and each of the words includes the ASCII code of at least one letter. The storage 12 further stores relationships between the LEDs 100 and the ASCII codes of the input of the transparent keys. The shift register 13 is configured for storing the ASCII code of the input of each pressed transparent key.

The processor 11 includes an ASCII code determining module 111, an ASCII code storing module 112, a searching module 113, and an LED controlling module 114.

The ASCII code determining module 111 is configured for determining which key on the keyboard 10 is pressed.

The ASCII code storing module 112 is configured for storing the ASCII code of the input of the currently pressed key to the shift register 13 when the ASCII code determining module 111 determines the currently pressed key is one of the transparent keys.

The searching module 113 is configured for searching in the dictionary corresponding to the character input method in use to determine whether at least one ASCII code is possible as a next input towards typing a word from the dictionary according to the stored ASCII codes.

The LED controlling module 114 is configured for lighting up at least one LED 100 corresponding to the at least one found ASCII code according to the stored relationships between the LEDs 100 and the ASCII codes of the input of the transparent key.

The LED controlling module 114 is further configured for immediately turning off all the lit up LEDs 100, once the ASCII code determining module 111 determines a key connected to a lit up LED 100 is currently pressed. In the exemplary embodiment, the ASCII determining module 111 first determines whether one of the transparent keys is pressed. If one of the transparent keys is pressed, the ASCII code determining module 111 further determines whether the ASCII code of the input of the pressed key is one of the found ASCII codes.

The ASCII code storing module 112 is configured for storing the ASCII code of the input of each pressed transparent key to the shift register 13.

The LED controlling module 114 turns off all the lit up LEDs 100, and the ASCII code storing module 112 subsequently deletes all the stored ASCII codes, when the ASCII code determining module 111 determines a confirm key (not shown) is pressed. In the exemplary embodiment, when the confirm key is pressed, a word is input to the electronic device 1.

Figure 2A:
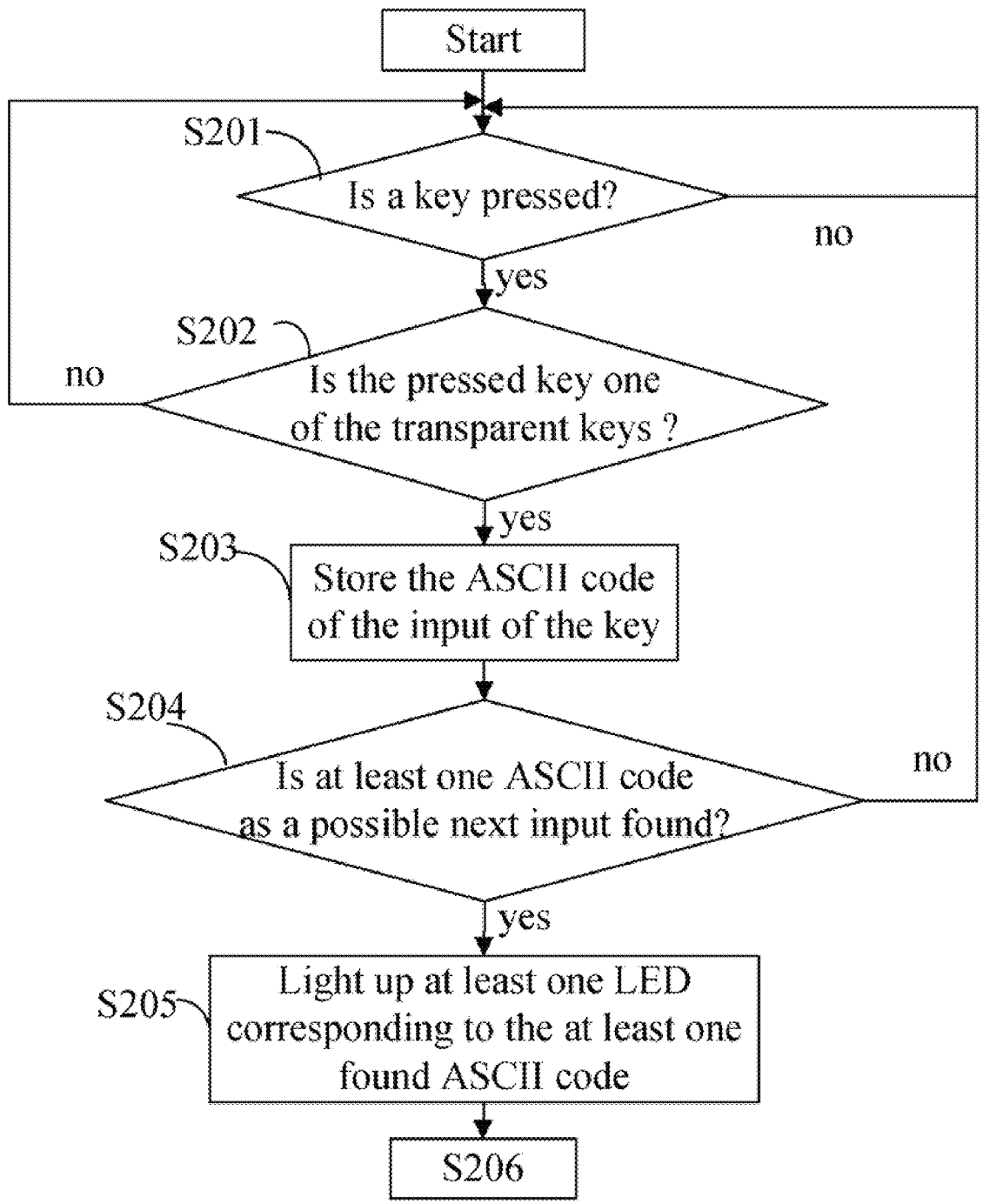
FIGS. 2A-2B are a flowchart of a method of typing prompting of the electronic device of FIG. 1 in accordance with an exemplary embodiment.
Figure 2B:
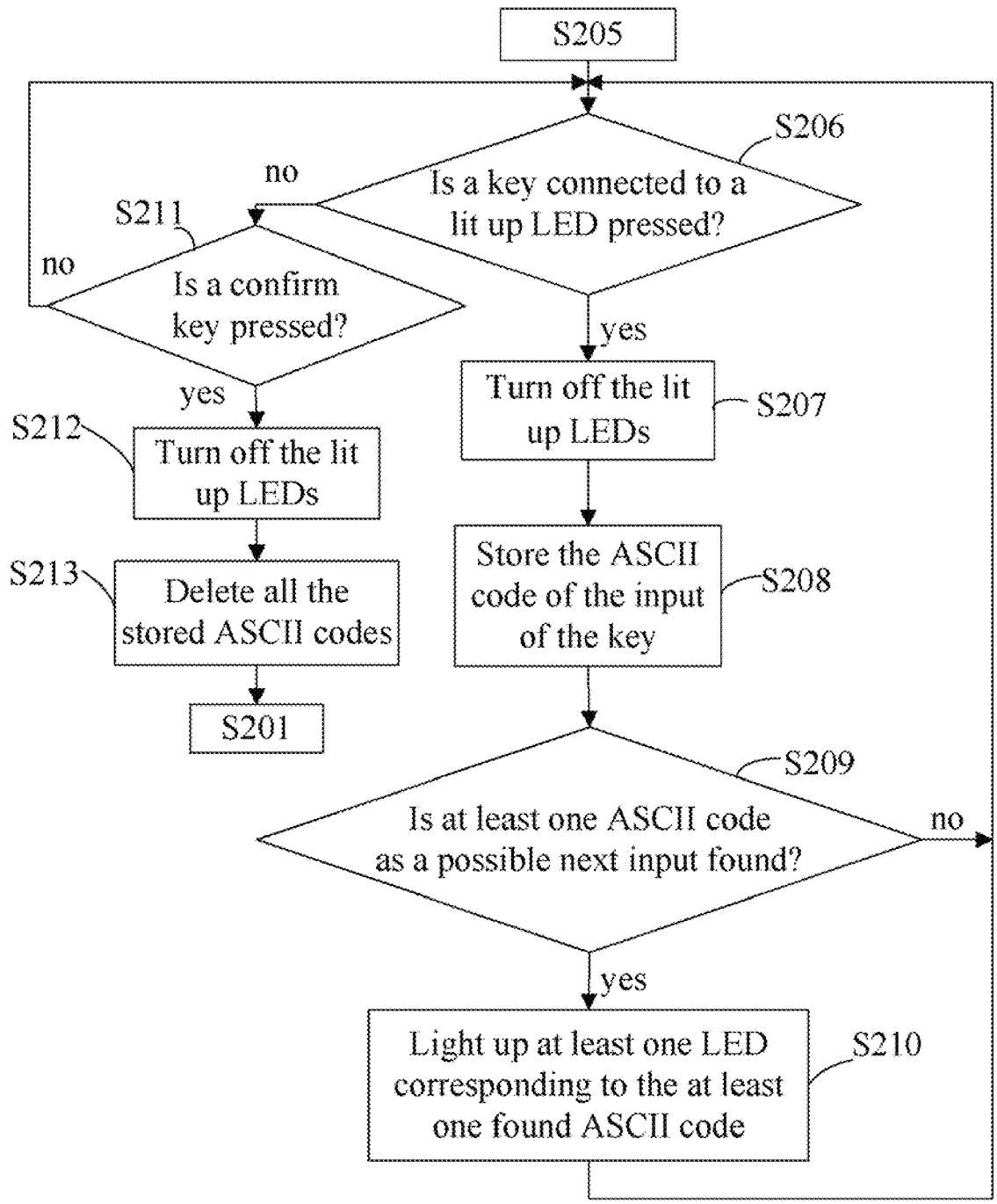

Shown in FIG. 2A-FIG 2B is a flowchart of a method of typing prompt in accordance with an exemplary embodiment.

In step S201, the ASCII code determining module 111 determines whether a key on the keyboard 10 is pressed. If yes, the procedure goes to step S202, otherwise the ASCII code determining module 111 continues to determine whether a key is pressed.

In an alternative embodiment, the ASCII determining module 111 determines whether a key is pressed until the special key is pressed.

In step S202, the ASCII code determining module 111 determines whether one of the transparent keys is pressed.

In step S203, the ASCII code storing module 112 stores the ASCII code of the input of the pressed key to the shift register 13.

In step S204, the searching module 113 searches in the dictionary corresponding to the character input method in use to determine whether at least one ASCII code exists as a possible next code towards typing a word from the dictionary according to the stored ASCII code. If no such ASCII code is found, the procedure goes to step S201, otherwise the procedure goes to step S205.

In step S205, the LED controlling module 114 lights up at least one LED 100 corresponding to the at least one found ASCII code.

In step S206, the ASCII code determining module 111 determines whether a key connected to a lit LED is pressed. If yes, the procedure goes to step S207, otherwise the procedure goes to step S211. In the exemplary embodiment, the ASCII code determining module 111 first determines whether one of the transparent keys is pressed. If one of the transparent keys is pressed, the ASCII code determining module 111 further determines whether the ASCII code of input of the pressed key is one of the found ASCII codes.

In step S207, the LED controlling module 114 turns off all the lit up LEDs 100.

In step S208, the ASCII storing module 112 stores the ASCII code of the pressed key to the shift register 13.

In step S209, the searching module 113 searches in the dictionary corresponding to the character input method in use to determine whether at least one ASCII code exists as a possible next code towards typing a word from the dictionary. If no such ASCII code is found, the procedure goes to step S206, otherwise the procedure goes to step S210.

In step S210, the LED controlling module 114 lights the LED 100 corresponding to the at least one found ASCII code according to the stored relationships between the LEDs 100 and the ASCII codes of the input of the transparent keys. After executing step S210, the procedure goes to step S206.

In step S211, the ASCII code determining module 111 determines whether a confirm key is operated by the users. If yes, the procedure goes to step S212, otherwise the procedure goes to step S206. In the exemplary embodiment, when a confirm key is operated, a word is input to the electronic device 1.

In step S212, the LED controlling module 114 turns off all the lit up LEDs 100.

In step S213, the ASCII code storing module 112 deletes all the stored ASCII codes. After executing step S213, the procedure goes to step S201.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device with typing prompt function, comprising:
    a plurality of labeled transparent keys arranged on a keyboard, wherein each of the transparent keys is connected to a Light Emitting Diode (LED);
    a storage configured for storing at least one dictionary corresponding to a character input method, and relationships between the LEDs and ASCII codes of the input of the transparent keys, wherein the dictionary comprises a plurality of words and each of the words comprises at least one ASCII code of the input of a transparent key;
    a shift register configured for storing the ASCII codes of the input of the transparent keys;
    an ASCII code determining module configured for determining which key is pressed;
    an ASCII code storing module configured for storing the ASCII codes of the input of the pressed transparent keys to the shift register;
    a searching module configured for searching in the dictionary corresponding to the character input method in use to find at least one ASCII code as a possible next input towards typing a word from the dictionary according to the stored ASCII code; and
    an LED controlling module configured for lighting up the at least one LED corresponding to the at least one found ASCII code according to the relationships between the LEDs and the ASCII codes of the input of the transparent keys.

2. The electronic device as described in claim 1, wherein the LED controlling module turns off all the lit up LEDs, when the ASCII code determining module determines a key connected to a lit LED is pressed.

3. The electronic device as described in claim 2, wherein the ASCII code determining module determines a key connected to a lit up LED is pressed if the ASCII code of the input of the pressed key is one of the found ASCII codes.

4. The electronic device as described in claim 1, wherein the ASCII code storing module is configured for deleting all the stored ASCII codes when the ASCII code determining module determines a confirm key is pressed.

5. The electronic device as described in claim 1, wherein the LED controlling module is configured for turning off all the lit up LEDs if the ASCII code determining module determines a confirm key is pressed.

6. The electronic device as described in claim 1, wherein the transparent keys are the A~Z keys.

7. A method of typing prompt, comprising:
    providing a keyboard, wherein a plurality of labeled transparent keys are arranged on the keyboard and each of the transparent key is connected to a Light Emitting Diode (LED);
    determining whether a transparent key is pressed;
    storing the ASCII code of the input of the pressed transparent key;
    searching in a provided dictionary corresponding to a character input method in use to find at least one ASCII code as a possible next input towards typing a word from the dictionary according to the stored ASCII code; and
    lighting the at least one LED corresponding to the at least one found ASCII code according to provided relationships between the LEDs and the ASCII codes of the input the transparent keys.

8. The method as described in claim 7, further comprising:
    determining whether a key connected to a lit up LED is pressed;
    turning off all the lit up LED if a key connected to a lighted LED is pressed; and
    storing the ASCII code of the input of the pressed key.

9. The method as described in claim 8, wherein the step of determining a key connected to a lit up LED is pressed comprises:
    determining a key connected to a lit up LED is pressed if the ASCII code of the input of the pressed key is one of the found ASCII codes.

10. The method as described in claim 7, further comprising:
    determining whether a confirm key is pressed;
    turning off all the lit up LEDs if a confirm key is pressed; and
    deleting all the stored ASCII codes if a confirm key is pressed.

* * * * *